(12) United States Patent
Neumann et al.

(10) Patent No.: US 8,708,095 B2
(45) Date of Patent: Apr. 29, 2014

(54) EXHAUST SYSTEM

(71) Applicant: J. Eberspächer GmH & Co. KG, Esslingen (DE)

(72) Inventors: Felix Neumann, Esslingen (DE); Viktor Koch, Göppingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 13/724,457

(22) Filed: Dec. 21, 2012

(65) Prior Publication Data

US 2013/0161124 A1    Jun. 27, 2013

(30) Foreign Application Priority Data

Dec. 23, 2011  (DE) .................. 10 2011 089 772

(51) Int. Cl.
*F01N 13/08*    (2010.01)

(52) U.S. Cl.
USPC ............................ 181/228; 181/227; 181/212

(58) Field of Classification Search
USPC .......................................... 181/228, 227, 212
See application file for complete search history.

(56) References Cited

U.S. PATENT DOCUMENTS 5,446,790 A *  8/1995  Tanaka et al. .............. 381/71.14
5,574,264 A * 11/1996  Takemori et al. ............ 181/206
8,074,765 B2  12/2011  Goto et al.
8,360,192 B2   1/2013  Krüger et al.
2006/0027420 A1*  2/2006  Hahnl et al. .................. 181/283
2006/0037808 A1*  2/2006  Kruger et al. ................. 181/206
2008/0053747 A1*  3/2008  Krueger et al. .............. 181/206
2011/0000734 A1   1/2011  Kruger et al.

FOREIGN PATENT DOCUMENTS

| DE | 10 2004 040 421 A1 | 3/2006 | |
| DE | 10 2009 031 848 A1 | 1/2011 | |
| EP | 0674097 A1 | 9/1995 | |
| JP | 06093826 A * | 4/1994 | ............ F01N 1/00 |
| JP | 06101444 A * | 4/1994 | ............ F01N 1/00 |
| JP | 2001 207 843 A | 8/2001 | |

* cited by examiner

*Primary Examiner* — Forrest M Phillips
(74) *Attorney, Agent, or Firm* — McGlew and Tuttle, P.C.

(57) ABSTRACT

An exhaust system (1) for an internal combustion engine, in particular of a motor vehicle, has at least one exhaust tract (2), which has at least one exhaust pipe (3) which conducts exhaust gas, and has at least one active silencer (5). The active silencer (5) has a silencer housing (6) and at least one electro-acoustic converter (7) which is arranged in the silencer housing (6) and at least one connection pipe (8), which connects the silencer housing (6) fluidically to the exhaust pipe (3). The thermal loading of the converter (7) is reduced with a sound propagation path (9) formed for the propagation of airborne noise in the connection pipe (8) being impermeable to thermal radiation (16) emanating from the exhaust gas in the exhaust pipe (3).

20 Claims, 6 Drawing Sheets

Fig. 14

EXHAUST SYSTEM

CROSS REFERENCE TO RELATED APPLICATIONS

This application claims the benefit of priority under 35 U.S.C. §119 of German Patent Application a DE 10 2011 089 772.0 filed Dec. 23, 2011, the entire contents of which are incorporated herein by reference.

FIELD OF THE INVENTION

The present invention relates to an exhaust system for an internal combustion engine, in particular of a motor vehicle.

BACKGROUND OF THE INVENTION

An exhaust system usually comprises at least one exhaust tract, which has at least one exhaust pipe which guides exhaust gas. The respective exhaust tract is used to discharge exhaust gas which is produced in the combustion chambers of the internal combustion engine. Depending on the size of the internal combustion engine, the exhaust system manages with a single exhaust tract or comprises at least two exhaust tracts, for example in the case of a V engine. Exhaust gas treatment devices are usually arranged in the respective exhaust tract, such as catalysts, particle filters, SCR systems and silencers, which are connected to each other by means of exhaust pipes. An exhaust tract usually comprises an exhaust manifold on the input side, while an end pipe, what is known as an "exhaust", is arranged at the end. These end components can also be connected to exhaust pipes.

In the case of silencers (also known as mufflers), a distinction is drawn between passive silencers and active silencers. The passive silencers damp the airborne noise transported in the exhaust gas by means of resonance, reflection, expansion and/or absorption effects. In contrast to this, an active silencer operates with active noise control or antinoise, which is produced with the aid of a corresponding electro-acoustic converter, which is generally a loudspeaker. Combinations of active and passive silencers are likewise possible. In the present connection, it should in particular be avoided that an active silencer operates exclusively with antinoise. Rather, in the context of the present invention, an active silencer should optionally be able to comprise properties and/or components of a passive silencer also, such as at least one resonance, reflection, expansion and/or adsorption chamber.

An active silencer can have a silencer housing and at least one electro-acoustic converter arranged in the silencer housing, and at least one connection pipe. The silencer housing can be connected fluidically to the exhaust pipe with the aid of the connection pipe. In this manner, the silencer housing is bypass-connected to the exhaust tract, so the exhaust gas does not flow through it. The fluid connection between the silencer housing and the exhaust pipe, which is created with the aid of the connection pipe, ensures an acoustic coupling for airborne noise, so the noise carried in the exhaust gas can propagate in the direction of the silencer housing, while the noise generated by the electro-acoustic converter can be radiated into the exhaust pipe. A physical distance between the silencer housing and the exhaust pipe is also realised by means of the connection pipe, as a result of which the thermal loading of the converter can be reduced. It has been found, however, that the hot exhaust gases conducted in the exhaust pipe can still result in high thermal loading of the converter. Firstly, the hot exhaust gas can enter the connection pipe and reach the converter by means of diffusion processes. Secondly, the exhaust gas heats up the exhaust pipe, so heat can pass by thermal conduction from the exhaust pipe via the connection pipe to the silencer housing. Finally, thermal radiation can also spread from the exhaust gas or from the exhaust pipe through the connection pipe to the converter.

In order to reduce the thermal loading of the converter and of any electronics of the active silencer arranged in the silencer housing, it is possible in principle to equip the connection pipe with a cooler section between the silencer housing and the exhaust pipe. In this manner, the connection pipe can be cooled in that heat is emitted outwardly via the cooler section. For example, the connection pipe can have outwardly projecting, external cooling ribs in the cooler section. It is likewise conceivable to form a cooling jacket through which a coolant flows in the cooler section. For example, this cooling jacket can be fluidically coupled to a cooling circuit of the internal combustion engine equipped with the exhaust system.

SUMMARY OF THE INVENTION

The present invention is concerned with the problem of providing an improved or at least a different embodiment for an exhaust system of the type mentioned at the beginning, which in particular has reduced thermal loading of the converter.

According to the invention, an exhaust system is provided for an internal combustion engine of a motor vehicle. The exhaust system comprises an exhaust tract comprising at least one exhaust pipe which conducts exhaust gas and an active silencer. The active silencer comprises a silencer housing, an electro-acoustic converter arranged in the silencer housing and a connection pipe which connects the silencer housing fluidically to the exhaust pipe. At least one internal cooling rib is arranged in the connection pipe, the cooling rib projecting inwardly into a cross section of the connection pipe from a wall of the connection pipe.

The invention is based on the general concept of enlarging the thermal mass of the connection pipe with the aid of at least one internal cooling rib which projects into the cross section of the connection pipe, as a result of which the heat passes from the exhaust pipe to the silencer housing in a time-delayed and/or damped manner. In this manner the thermal loading of the converter can be reduced.

The reduced thermal loading of the converter and of any other electronic components in the silencer housing also makes it possible to arrange the active silencer further upstream, closer to the internal combustion engine, than has been previously possible. An arrangement close to the engine can be advantageous for certain requirements.

According to an advantageous embodiment, it can be provided for the at least one internal cooling rib to be arranged in a cooler section of the connection pipe, so that the respective internal cooling rib in the cooler section projects inwardly from a cooler wall of the cooler section and into the cross section of the connection pipe or of the cooler section. The positioning of the respective internal cooling rib in the cooling section means that the heat transmitted to the respective internal cooling rib can be dissipated from the respective internal cooling rib to a cooler wall of the cooler section, which encloses the cross section of the connection pipe in the circumferential direction and discharged through a cooling system of the cooler section which may be provided. In this respect, cooling of the respective internal cooling rib can be realized by the positioning of the respective internal cooling rib in the cooler section, which improves the efficiency of the thermal protection of the converter. In this case it is also of particular significance that the respective internal cooling rib contributes to increasing the thermal mass of the cooler section.

According to another advantageous embodiment, the above-mentioned cooler section can be a tubular body which is separate from the connection pipe and is installed in the connection pipe in a suitable manner, for example by means of welded connections or flange connections. It is in particular possible thereby to produce the cooler section from a different material from the connection pipe. For example, the connection pipe can be produced from an iron alloy or from a steel alloy, while the tubular body of the cooler section is produced from a lightweight metal alloy which has much better thermal conductivity. Furthermore, the separate tubular body of the cooler section allows an embodiment in which the connection pipe is produced from different materials on both sides of the cooler section. The connection pipe can thus be produced from a metallic material for example from the cooler section to the exhaust pipe, while it can be produced from a plastic from the cooler section to the silencer housing.

According to another advantageous embodiment, it can be provided for the acoustic coupling path created for airborne noise with the aid of the connection pipe to be configured in such a manner that it is impermeable to thermal radiation. In this manner thermal radiation is prevented from passing directly from the exhaust gas stream in the exhaust pipe or from the exhaust pipe through the connection pipe to the converter. In this manner the thermal loading of the converter by thermal radiation can be significantly reduced.

According to a first general development of this embodiment, it is proposed that the connection pipe be curved in such a manner that there is no straight, continuous radiation path from the exhaust pipe to the silencer housing through the connection pipe. Direct heating of the converter by thermal radiation can thus be avoided. To this end, the connection pipe can have for example a 90° bend or an S-bend.

According to a second general development, it is proposed that the at least one internal cooling rib be arranged in a cross section of the connection pipe in such a manner that the connection pipe remains permeable to airborne noise, while the at least one internal cooling rib closes the cross section of the connection pipe in an opaque manner in a viewing direction running parallel to the longitudinal center axis of the connection pipe. With the aid of the respective internal cooling rib, the passage of thermal radiation through the connection pipe can thus likewise be effectively prevented, while the propagation of the airborne noise through the connection pipe is largely unhindered. The thermal loading of the converter can also be significantly reduced thereby. The use of the at least one internal cooling rib for blocking off in an opaque manner the cross section of the connection pipe, which is permeable to airborne noise, makes it possible to use a straight connection pipe, which can be realized in a particularly cost-effective manner and is correspondingly preferred. In principle, the alternative developments proposed here can also be combined with each other, so that a curved connection pipe is provided, the cross section of which is closed in an opaque manner in the viewing direction with the at least one internal cooling rib.

The respective internal cooling rib can expediently be a sheet metal body, which has high thermal conductivity and heat resistance. Expediently, a plurality of such internal cooling ribs is provided, which project inwardly from a pipe wall of the connection pipe or from the above-mentioned cooler wall of the cooler section. The use of a plurality of internal cooling ribs allows a configuration of the internal cooling rib such that they only insignificantly hinder the propagation of airborne noise along the sound propagation path. Alternatively to a plurality of internal cooling ribs which each project inwardly from the pipe wall or from the cooler wall, the internal cooling rib can also be formed by a perforated metal sheet. Such a perforated metal sheet can in particular be arranged in such a manner that it closes off the cross section of the connection pipe or of the cooler section to thermal radiation. For example, the holes in the perforated metal sheet can be formed by putting out tabs, the said tabs expediently being put out in such a manner that they block the associated openings in the viewing direction.

According to a preferred embodiment, the respective internal cooling rib can however be configured as a vane which is in particular placed at an angle to the longitudinal center axis. Such vanes, which can also be referred to as guide vanes in a pipe through which flow passes, which is not the case with the connection pipe here, have comparatively low acoustic resistance, so such vanes only hinder the sound propagation path slightly.

According to an advantageous development, a plurality of internal cooling ribs can be arranged in a star-shaped manner, as a result of which a rotational symmetry is produced for the interaction of the internal cooling ribs with the sound propagation path. The cooling ribs arranged in a star-shaped manner can be arranged such that they are free-standing on the radial inner side, so that they do not touch each other. Alternatively, it is likewise possible that the internal cooling ribs arranged in a star-shaped manner rest on each other at a common center. The free-standing arrangement avoids thermally induced stresses. However, a common center allows the internal cooling ribs to be realized as a unit which can be inserted into the respective cross section as a separate component. If the internal cooling ribs arranged in a star-shaped manner are configured as vanes, the arrangement of the internal cooling ribs can be configured like a static mixer and in particular in the form of a swirl generator. As the exhaust gas does not flow through the connection pipe, there is no mixing or swirl generation, but in particular opaque closing off of the respective cross section in the region of the internal cooling ribs, with an open and largely unhindered sound propagation path.

According to another advantageous embodiment, the respective internal cooling rib can extend at least along the cooler wall in the longitudinal direction of the connection pipe or of the cooler section and in the circumferential direction. The sound propagation path thus follows a curved path, which forms a negligible obstacle for the sound propagation but forms an insurmountable obstacle for straight thermal radiation.

In another embodiment, a plurality of internal cooling ribs can be configured as straight vanes which run parallel to each other. In particular, the internal cooling ribs can be designed as a vane grid.

According to another expedient embodiment, which operates with a plurality of internal cooling ribs, a leading edge of an internal cooling rib can overlap a leading edge of an adjacent internal cooling rib in the viewing direction or align in the viewing direction. In this manner, it is achieved in a particularly simple manner that the individual internal cooling ribs each block a section of the cross section of the connection pipe or of the cooler section in the viewing direction in such a manner that all the internal cooling ribs together close off in particular the entire cross section in the viewing direction in an opaque manner, while at the same time sufficient gaps or distances are present between adjacent internal cooling ribs to allow largely unhindered passage for airborne noise.

Instead of an opaque arrangement of a plurality of internal cooling ribs, it can be provided in another embodiment for the plurality of internal cooling ribs to extend straight and parallel to the longitudinal center axis of the connection pipe or parallel to the longitudinal center axis of the cooler section. The arrangement of the internal cooling ribs is then basically permeable to thermal radiation but still effects comparatively high thermal absorption, which protects the heat-sensitive components of the active silencer. At the same time, in this embodiment, the arrangement of the internal cooling ribs promotes the passage of the airborne noise, which improves the effectiveness of the active silencer.

According to another advantageous embodiment, the above-mentioned cooler section can have a plurality of external cooling ribs, which project outwardly from the cooler wall of the cooler section. This measure significantly increases the surface area of the cooler section which is available for heat dissipation, which improves the emission of heat into the environment of the connection pipe.

According to an expedient development, the external cooling ribs can be aligned parallel to the longitudinal center axis of the cooler section and arranged in a star-shaped manner or parallel to each other. The star-shaped arrangement improves heat dissipation. The parallel arrangement however simplifies the production of the cooler section with the external cooling ribs as an integral unit, in particular as a cast part.

According to another advantageous embodiment, a cooling airstream generator can be provided, which generates a cooling airstream which is applied to the cooler section from the outside. In this manner, the cooler section is actively cooled, namely by means of the cooling airstream generated specifically for the purpose. Alternatively, it is in principle possible for the cooler section to be equipped with a cooling jacket, which is connected to a cooling circuit in which a coolant, preferably a cooling liquid, circulates. For example, such a cooling circuit can be coupled to a cooling circuit of the internal combustion engine.

According to another advantageous embodiment, the respective internal cooling rib can be configured as a hollow body, and coolant, preferably a cooling liquid, can flow through it. The respective internal cooling rib is then connected through the cooler wall of the cooler section to a cooling circuit in which the coolant circulates. This cooling circuit can in particular be coupled to a cooling circuit of the internal combustion engine. Moreover, it is in principle possible to combine the internal cooling ribs which are cooled actively with a coolant to the above-mentioned cooling jacket for cooling the cooler section.

According to another advantageous embodiment, the respective internal cooling rib can be formed integrally on the pipe wall of the connection pipe or on the cooling wall of the cooler section. The integral construction then makes the production of the active silencer and the exhaust system easier. In particular, the integral construction makes it easier to realize the above-mentioned tubular body as a monolithic cast part. Additionally or alternatively, the above-mentioned external cooling ribs of the cooler section can be formed integrally on the said cooler wall, which also makes cost-effective production as a cast part easier. In particular, the cooler section can then be realized in the form of a monolithic tubular body, which can integrally comprise the at least one internal cooling rib and optionally also the external cooling ribs.

It is self-evident that the features which are mentioned above and those which are still to be explained below can be used not only in the combination specified in each case, but also in other combinations or alone without departing from the scope of the present invention.

Preferred exemplary embodiments of the invention are shown in the drawings and are explained in more detail in the following description, with the same reference symbols referring to the same or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, according to FIGS. 1 to 4, an exhaust system 1, which is only partially shown here and is used to discharge exhaust gas in an internal combustion engine, which is preferably arranged in a motor vehicle, comprises at least one exhaust tract 2, which has at least one exhaust-gas-conducting exhaust pipe 3. An exhaust gas stream in the exhaust pipe 3 is indicated by an arrow and referred to with 4 in FIGS. 1 and 2. The exhaust system 1 comprises at least one active silencer 5. This has a silencer housing 6 and at least one electro-acoustic converter 7, which is arranged in the silencer housing 6. Furthermore, a connection pipe 8 is provided, via which the silencer 5 is acoustically connected to the exhaust pipe 3. To this end, the connection pipe 8 connects the silencer housing 6 fluidically to the exhaust pipe 3. To do this, the connection pipe 8 defines a sound propagation path 9, which is indicated by arrows, is formed in the connection pipe 8 and allows the propagation of airborne noise. In FIGS. 1 to 4, pressure pulses 10 are indicated, which represent propagation of airborne noise along the sound propagation path 9 from the converter 7 in the direction of the exhaust pipe 3. These pressure pulses 10 are phase-shifted in relation to pressure pulses of a noise to be damped which is carried in the exhaust gas stream 4.

In the preferred example shown of the exhaust system 1, the connection pipe 8 comprises a cooler section 11, which is arranged in the connection pipe 8 between the silencer housing 6 and the exhaust pipe 3. In another embodiment, such a cooler section 11 can in principle be dispensable.

According to FIGS. 1 to 16, the cooler section 11 comprises a cooler wall 12, which completely encloses a cross section 13 of the connection pipe 8 and/or a cross section 13 of the cooler section 11 in the circumferential direction. Further, the cooler section 11 has a straight construction and correspondingly has a straight longitudinal center axis 14, which coincides with a longitudinal center axis 15 of the connection pipe 8 in the preferred embodiment shown in FIGS. 1 and 2, in which the connection pipe 8 is straight.

Figure 2:
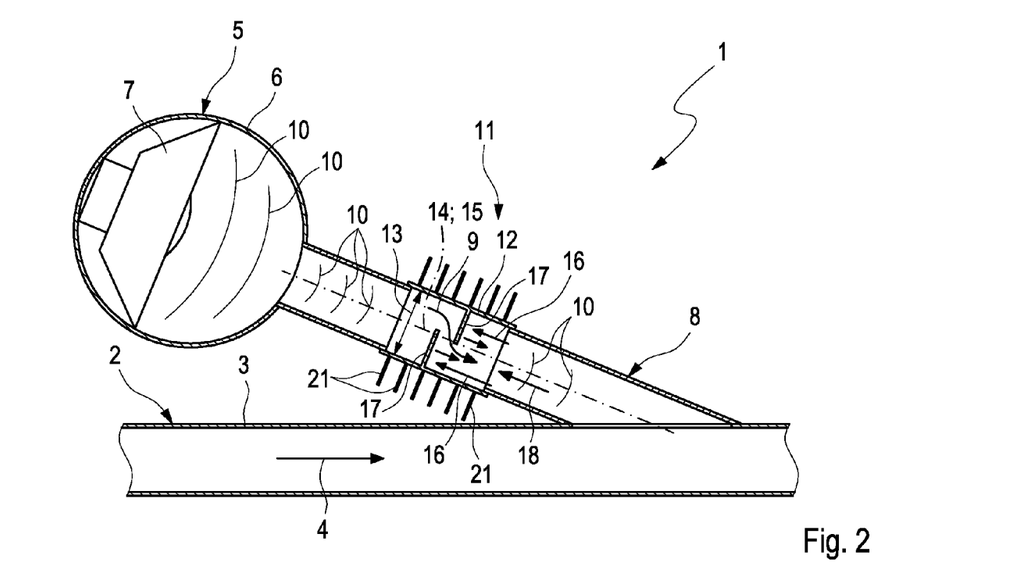
FIG. 2 is a schematic sectional view showing a view as in FIG. 1 with a longitudinally cut away cooler section.
Figure 5:
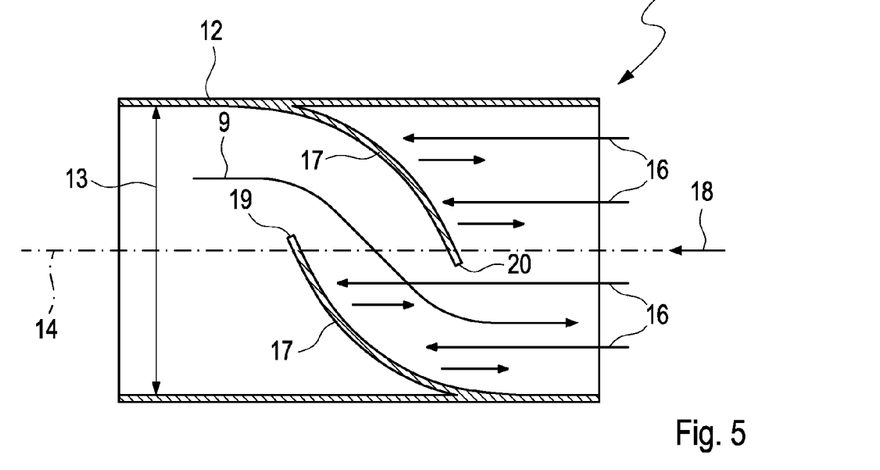
FIG. 5 is a highly simplified longitudinal sectional view through the cooler section.
Figure 6:
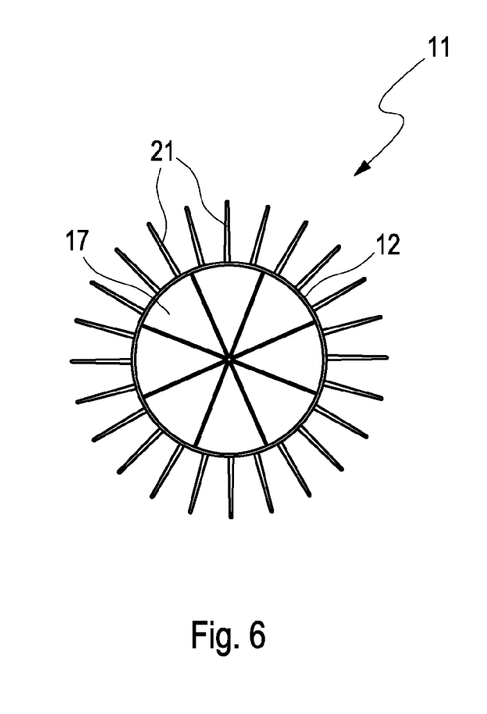
FIG. 6 is a schematic cross sectional view of a cooler section.
Figure 7:
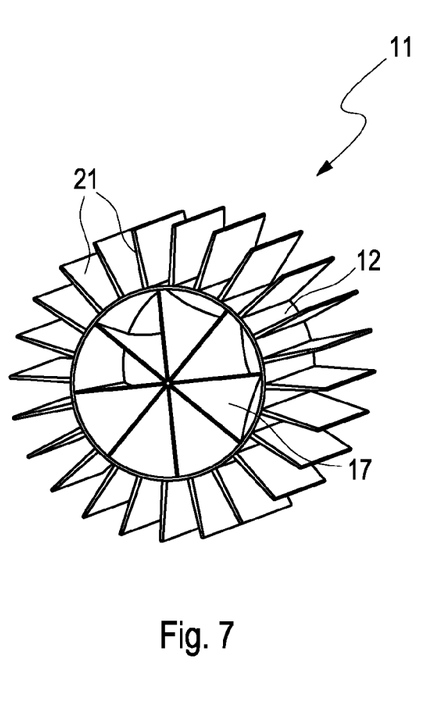
FIG. 7 is a schematic isometric view of the cooler section of FIG. 6.
Figure 8:
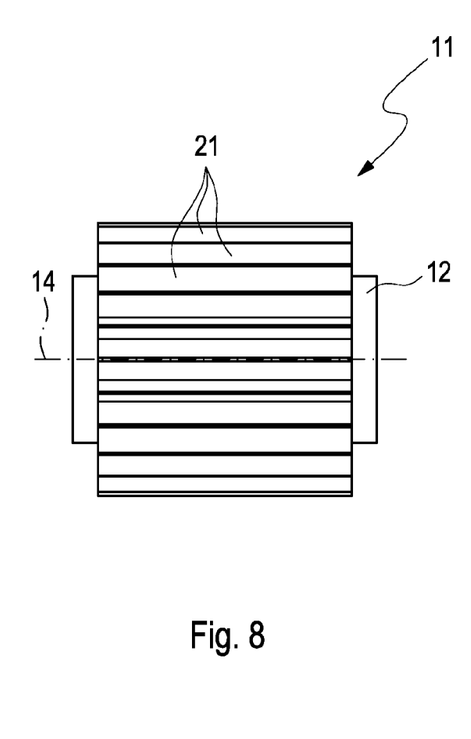
FIG. 8 is a schematic side view of the cooler section of FIG. 6.
Figure 9:
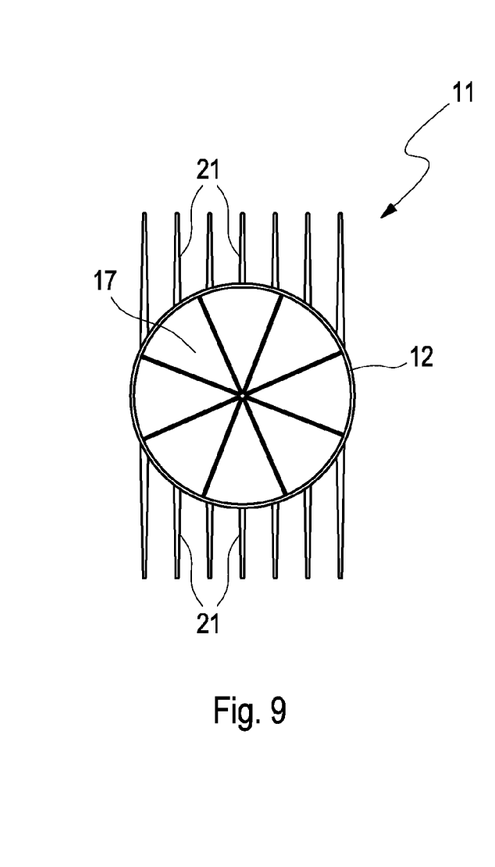
FIG. 9 is a schematic cross sectional view of the cooler section as in FIG. 6, but with a different embodiment.
Figure 10:
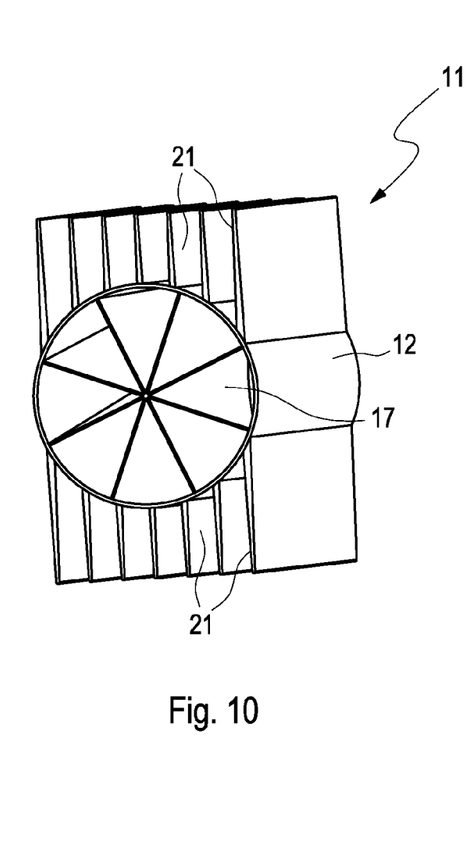
FIG. 10 is a schematic isometric view of the cooler section of FIG. 9.
Figure 11:
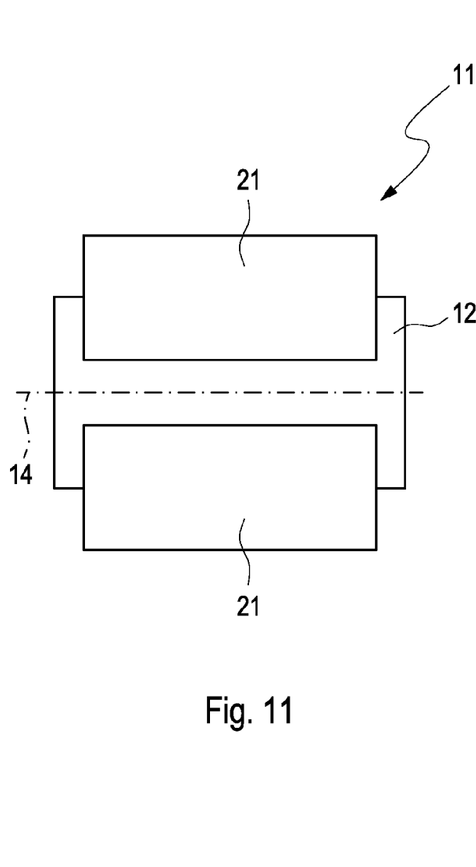
FIG. 11 is a schematic side view of the cooler section of FIG. 9.

According to a preferred embodiment, the sound propagation path 9 can be impermeable to thermal radiation 16, which is indicated in FIGS. 2 and 5 and emanates from the exhaust gas or exhaust gas stream 4 in the exhaust pipe 3. The thermal loading of the converter 7 by thermal radiation 16 can thereby be considerably reduced.

Figure 3:
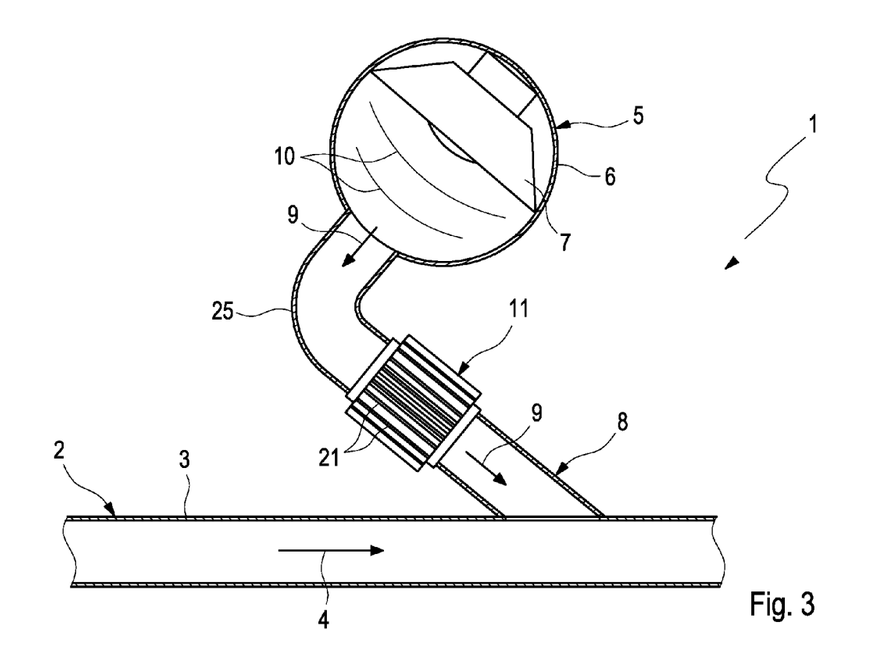
FIG. 3 is a schematic sectional view showing a view as in FIG. 1, but with a different embodiment.
Figure 4:
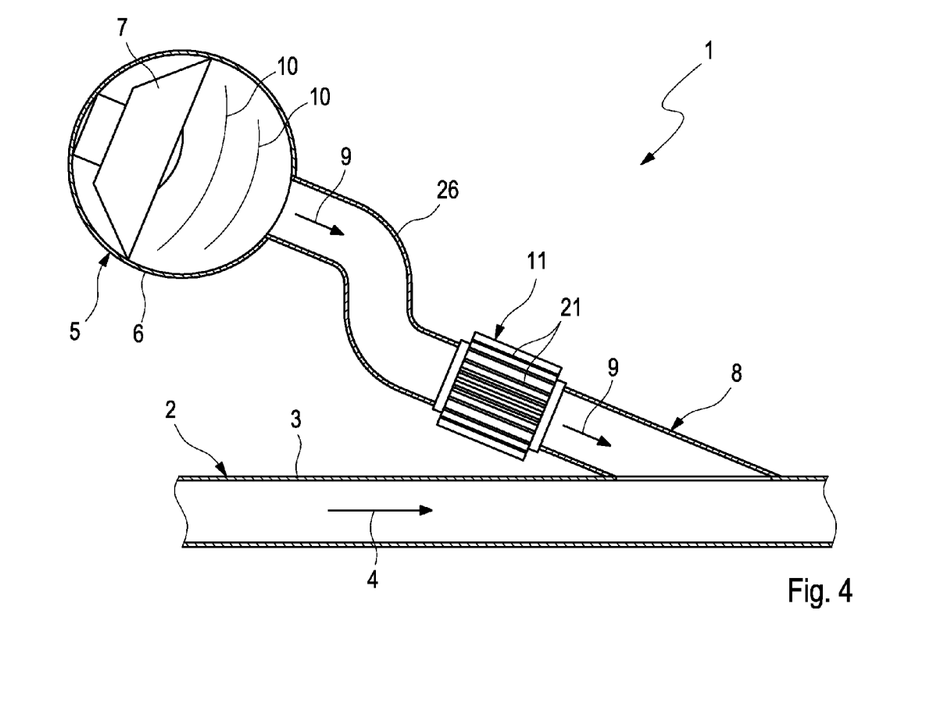
FIG. 4 is a schematic sectional view showing a view as in FIG. 3, but with a further embodiment.

In a particularly simple case, which is shown here in FIGS. 3 and 4, the sound propagation path 9 can be designed to be impermeable to thermal radiation 16 in that the connection pipe 9 is curved in such a manner that no straight connection leads in an unhindered manner from the exhaust pipe 3 to the silencer housing 6 through the connection pipe 8. For example, FIG. 3 shows a connection pipe 8, which has a 90° bend 25 between the exhaust pipe 3 and the silencer housing 6, which bend prevents propagation of the thermal radiation in a straight line from the exhaust pipe 3 to the silencer housing 6. FIG. 4 shows a variant in which the connection pipe 8 has an S-shaped bend 26 or S-bend 26 or S-profile 26, which likewise prevents propagation of thermal radiation in a straight line from the exhaust pipe 3 to the silencer housing 6.

Figure 1:
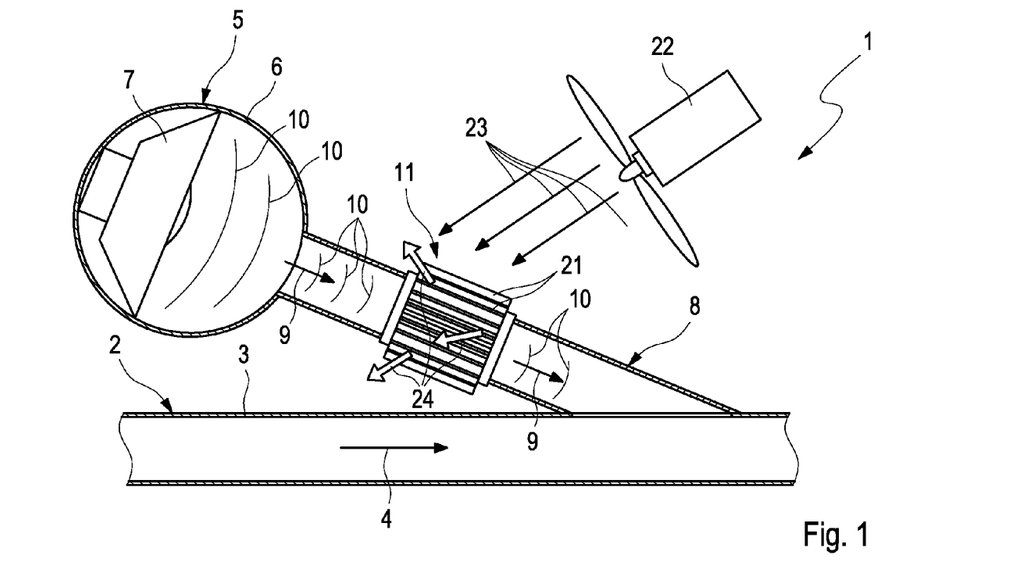
FIG. 1 is a schematic sectional view of an exhaust system in the region of an active silencer.

In contrast to this, a straight connection pipe 8 is used in the embodiments shown in FIGS. 1 and 2. The features described below can however in principle also be realised in a curved connection pipe 8.

In order to reduce the transmission of heat from the exhaust pipe 3 to the silencer housing 6 along the sound propagation path 9, a plurality of internal cooling ribs 17 is provided in the cross section 13 of the connection pipe 8 or of the cooler section 11, which ribs are arranged in the connection pipe 8 or in this case in the cooler section 11 in such a manner that the arrangement of the internal cooling ribs 17 is permeable to the airborne noise. According to the present concept of reducing the thermal radiation in a straight connection pipe 8 too, the internal cooling ribs 17 can optionally be arranged in such a manner that they close off the cross section 13 of the cooler section 11 in an opaque manner in a viewing direction 18 which runs parallel to the longitudinal center axis 14 of the cooler section 11. Although a plurality of internal cooling ribs 17 is always provided in the exemplary embodiments shown here, an embodiment in which only one single internal cooling rib 17 is present is also conceivable in principle. The cross section 13 can then in principle also be blocked in an opaque manner with only a single internal cooling rib 17.

The internal cooling ribs 17 are expediently produced from a metallic material. For example, they can be sheet metal bodies. The internal cooling ribs 17 project inwardly from the cooler wall 12 and thus into the cross section 13. In the embodiments of FIGS. 2 and 6 to 13, the internal cooling ribs 17 are each configured as vanes, which are placed at an angle to the longitudinal center axis 14. According to the embodiments of FIGS. 6 to 11, the internal cooling ribs 17 can expediently be arranged in a star-shaped manner, wherein the individual internal cooling ribs 17 can rest on each other on the radially inner side at a common center. It is likewise possible to arrange the internal cooling ribs 17 in such a manner that they are free-standing on the radially inner side and do not touch each other. In the embodiments of FIGS. 6 to 11, the internal cooling ribs 17 are arranged in such a manner that they have the structure of a swirl generator. The internal cooling ribs 17 can generally be arranged in the manner of a static mixer.

Figure 12:
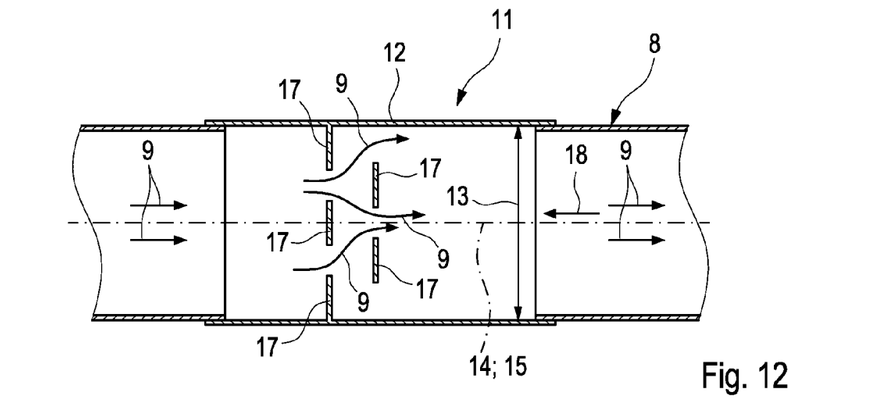
FIG. 12 is a schematic highly simplified longitudinal sectional view of the exhaust system in the region of a cooler section in another embodiment.
Figure 13:
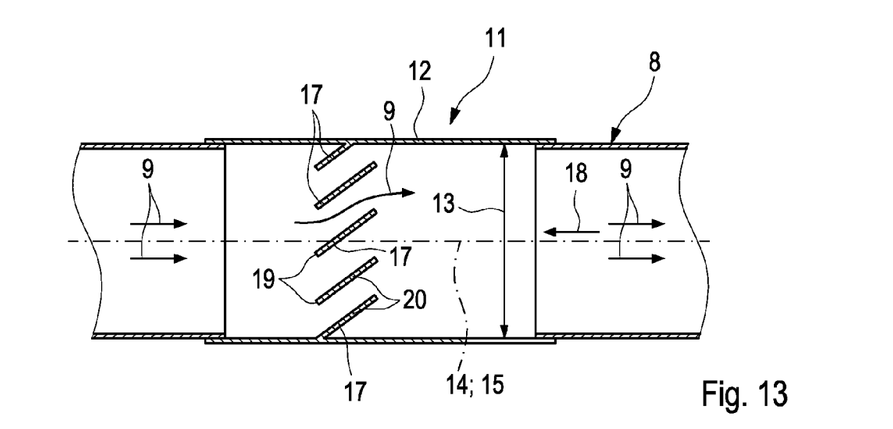
FIG. 13 is a schematic longitudinal sectional view as in FIG. 12, but with a further embodiment.

FIGS. 2, 12 and 13 show embodiments in which the internal cooling ribs 17 are designed as straight vanes which run parallel to each other. The internal cooling ribs 17 of FIGS. 2 and 12 are placed at 90° with respect to the longitudinal center axis 14, so that they extend with their surface perpendicular to the longitudinal center axis 14. Furthermore, in the embodiments of FIGS. 2 and 12, the internal cooling ribs 17 are arranged offset to each other in the axial direction, that is, parallel to the longitudinal center axis 14. Furthermore, the internal cooling ribs 17 which are axially offset with respect to each other are also offset to each other transversely to the longitudinal center axis 14 in such a manner that the optionally desired opaque blocking of the cross section 13 is produced in the viewing direction 18.

In the embodiment shown in FIG. 13, the vane-shaped internal cooling ribs 17 which extend parallel to each other are placed at approximately 45° with respect to the longitudinal center axis 14. Further, the internal cooling ribs 17 are in this case dimensioned in such a manner that an overlap is produced in the viewing direction 18 to block the cross section 13 in an opaque manner.

In the embodiments of FIGS. 2 and 5 to 13, preferably of FIGS. 5 to 11 and 13, shown here, a first edge 19 of an internal cooling rib 17 is arranged in the viewing direction 18 such that it overlaps or is flush with a second edge 20 of an adjacent internal cooling rib 17. The first edge 19 faces the silencer housing 6, whereas the second edge 20 faces away from the silencer housing 6.

Figure 14:
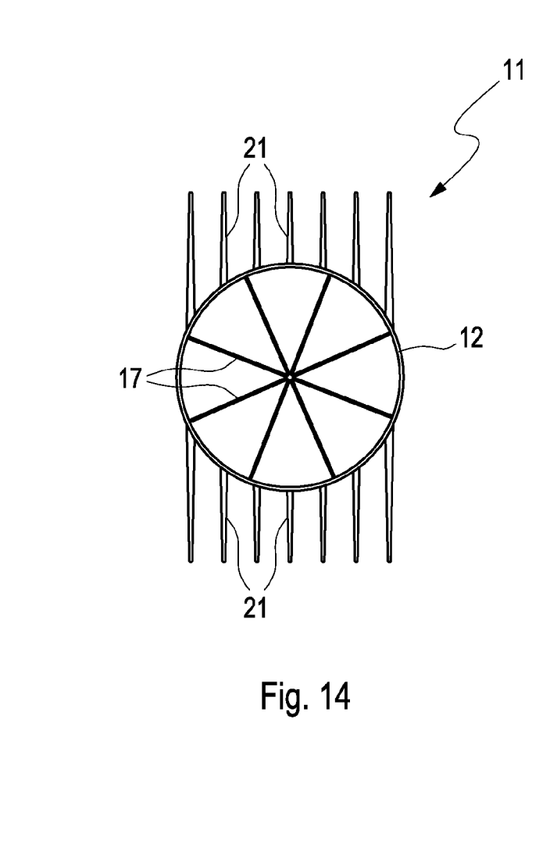
FIG. 14 is a schematic sectional view showing another cooler section in cross section.
Figure 15:
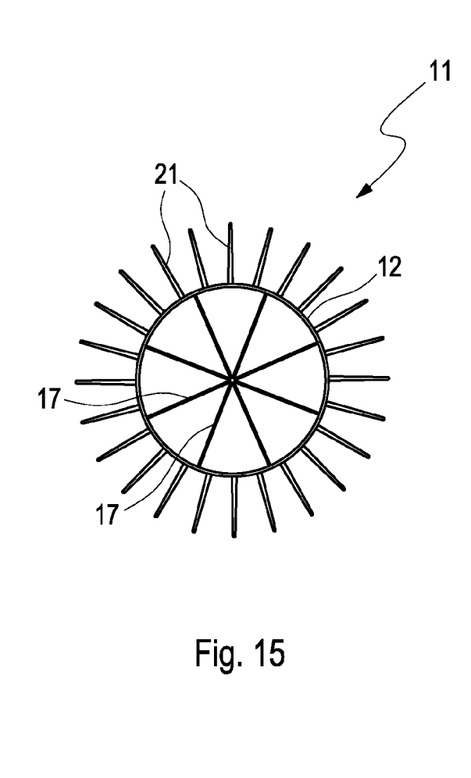
FIG. 15 is a schematic sectional view showing a further cooler section in cross section.
Figure 16:
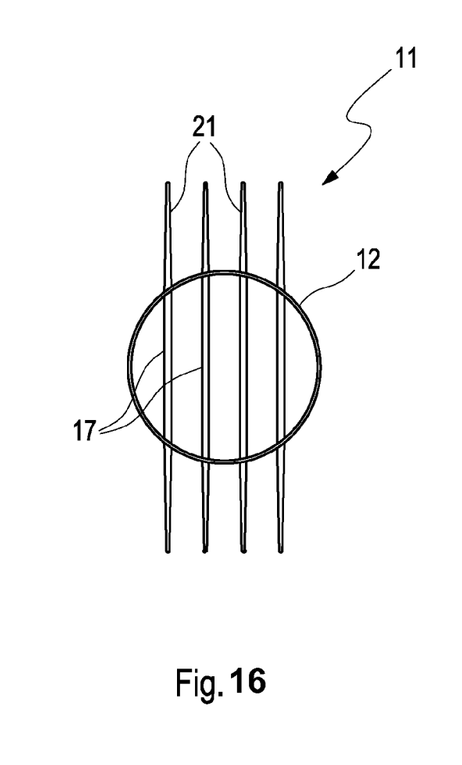
FIG. 16 is a schematic sectional view showing yet another cooler section in cross section.

Whereas the internal cooling ribs 17 are placed at an angle to the longitudinal center axis 14 or 15 in the embodiments of FIGS. 2 and 5 to 13, which results in a more or less pronounced blocking of the cross section 13 of the connection pipe 8 or of the cooler section 11, FIGS. 14 to 16 show embodiments in which the internal cooling ribs 17 run parallel to the longitudinal center axis 14 or 15 and thereby block the cross section 13 of the connection pipe 8 or of the cooler section 11 only minimally. These embodiments favour the least possible disruption of the sound propagation path 9. The efficiency of the active silencer 1 can be improved thereby. Although thermal radiation can penetrate through the gaps between adjacent internal cooling ribs 17, a comparatively large amount of heat can still be conducted out of the cross section 13 of the connection pipe 8 or of the cooler section 11 via the internal cooling ribs 17.

These embodiments can easily be combined with the embodiments shown in FIGS. 3 and 4, so the risk of excessive thermal loading of the temperature-sensitive components of the silencer 1 by thermal radiation is reduced in any case.

According to FIGS. 1 to 4 and 6 to 11 and 13 to 16, the cooler section 11 expediently has a plurality of external cooling ribs 21, which project outwardly from the cooler wall 12. According to FIGS. 1 and 3 to 11 and 14 to 16, the external cooling ribs 21 are expediently aligned parallel to the longitudinal center axis 14 of the cooler section 11. Alternatively, FIG. 2 shows an embodiment in which the external cooling ribs 21 are configured in a ring-shaped manner and extend in the circumferential direction as well as perpendicularly to the longitudinal center axis 14 of the cooler section 11. In the embodiments of FIGS. 1 and 3 to 8 and 15, the external cooling ribs 21 extend in a star-shaped manner. However, in the embodiments shown in FIGS. 9 to 11 and 14 and 16, the external cooling ribs 21 extend parallel to each other.

In FIG. 1 a cooling airstream generator 22 is shown, which is in this case indicated by a fan. With the aid of the cooling airstream generator 22, a cooling airstream 23 can be generated, which is indicated by arrows here, and which is applied to the cooler section 11 from the outside. Heat can thereby be discharged into the environment according to arrows 24.

The cooler section 11 is expediently a tubular body which is separate from the connection pipe 8 and is installed in the connection pipe 8 in a suitable manner, see in particular the diagrams of FIGS. 12 and 13. The internal cooling ribs 17 and/or the external cooling ribs 21 can in particular be formed integrally on the cooler wall 12. The cooler section 11 is thus expediently a monolithic cast part, which integrally comprises the cooler wall 12 and the internal cooling ribs 17 and optionally the external cooling ribs 21.

According to FIGS. 2 and 5, the thermal radiation 16 coming from the exhaust pipe 3 is partially reflected and partially absorbed at the internal cooling ribs 17 owing to the configuration of the sound propagation path 9, which is impermeable to thermal radiation 16, or owing to the opaque arrangement of the internal cooling ribs 17. The reflected heat does not contribute to the heating of the internal cooling ribs 17. The absorbed heat however heats the internal cooling ribs 17. Owing to their thermal conductivity, the internal cooling ribs 17 can transmit the absorbed heat to the cooler wall 12. In the examples, the absorbed heat passes from the cooler wall 12 into the external cooling ribs 21 and can be emitted by the latter into the environment. If necessary, this emission of heat can be assisted by the cooling airstream 23. It can optionally also be provided for the internal cooling ribs 17 to be connected to a cooling circuit in which a liquid coolant circulates in such a manner that this coolant flows through the internal cooling ribs 17.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine of a motor vehicle, the exhaust system comprising:
    an exhaust tract comprising at least one exhaust pipe which conducts exhaust gas;
    an active silencer comprising a silencer housing and an electro-acoustic converter arranged in the silencer housing and a connection pipe which connects the silencer housing fluidically to the exhaust pipe;
    a cooler section arranged between said silencer housing and said exhaust pipe, wherein at least one internal cooling rib is arranged in the cooler section, said cooler section having a cooler wall, the at least one internal cooling rib projecting inwardly into a cross section of the cooler section from said cooler wall, wherein said at least one internal cooling rib is exposed to the exhaust gas and said at least one internal cooling rib transfers heat from an interior of said cooler section to said cooler wall, said cooler section comprising a tubular body, said tubular body being separate from said connection pipe, said tubular body being directly connected to said connection pipe.

2. The exhaust system according to claim 1, wherein said cooler wall encloses a cross section of the connection pipe in a circumferential direction.

3. The exhaust system according to claim 2, wherein the cooler section is integrally connected to said at least one internal cooling rib to form a one-piece heat transfer structure, said cooler wall defining an inner cooler wall surface of said one-piece heat transfer structure, said connection pipe having an outer surface, wherein one end of said inner cooler wall surface is in direct contact with one portion of said outer surface and another end of said inner cooler wall surface is in direct contact with another portion of said outer surface.

4. The exhaust system according to claim 1, wherein:
    a sound propagation path formed for the propagation of airborne noise in the connection pipe is impermeable to thermal radiation emanating from the exhaust gas in the exhaust pipe.

5. The exhaust system according to claim 4, wherein:
    the connection pipe is curved in such a manner that no straight connection leads unhindered from the exhaust pipe to the silencer housing through the connection pipe to form the sound propagation path that is impermeable to thermal radiation emanating.

6. The exhaust system according to claim 4, wherein the at least one internal cooling rib is arranged in a cross section of the connection pipe in such a manner that the cross section of the connection pipe is permeable to airborne noise and the cross section of the connection is closed off in an opaque manner such that a line of sight path is blocked in a viewing direction which runs parallel to the longitudinal center axis of the connection pipe.

7. The exhaust system according to claim 2, wherein
    the at least one internal cooling rib is arranged in the cooler section such that it is permeable to airborne noise;
    the at least one internal cooling rib closes off the cross section of the cooler section in an opaque manner such that a line of sight path is blocked in a viewing direction which runs parallel to the longitudinal center axis of the cooler section.

8. The exhaust system according to claim 1, wherein at least another cooling rib is arranged in the connection pipe such that a plurality of internal cooling ribs are provided, which project inwardly from a wall of the connection pipe, each of said plurality of internal cooling ribs being integrally connected to said cooler wall to form a one-piece heat transfer structure, each of said plurality of internal cooling ribs extending from said cooler wall to a position in an interior of said cooler section, wherein each of said plurality of internal cooling ribs is exposed to the exhaust gas, each of said plurality of internal cooling ribs closing off a cross section of said cooler section such that a line of sight path is blocked in a viewing direction that extends parallel to a longitudinal center axis of said cooler section, wherein a portion of each of said plurality of internal cooling ribs overlaps with a portion of another one of plurality of internal cooling ribs with respect to said longitudinal center axis of said cooler section.

9. The exhaust system according to claim 1, wherein the at least one internal cooling rib extends at least along the wall of the connection pipe in a longitudinal direction of the connection pipe and in a circumferential direction, said at least one internal cooling rib being integrally connected to said cooler section to form a single, one-piece heat transfer structure, said connection pipe having a bent portion, said bent portion being arranged between said cooler section and said silencer housing.

10. The exhaust system according to claim 1, wherein the at least one internal cooling rib is configured as a vane.

11. The exhaust system according to claim 10, wherein
the vane is disposed at an angle to a longitudinal center axis;
the at least one internal cooling rib includes an additional vane to provide a plurality of straight vanes which run parallel to each other.

12. The exhaust system according to claim 1, wherein an edge of the at least one internal cooling rib, which faces the converter, overlaps an edge of an adjacent internal cooling rib which faces away from the converter in a viewing direction, or aligns therewith in the viewing direction, said adjacent internal cooling rib projecting inwardly from said cooler wall, said connection pipe being located at an acute angle with respect to said exhaust pipe.

13. The exhaust system according to claim 1, wherein the at least one internal cooling rib extends in a straight line and parallel to a longitudinal center axis of the connection pipe.

14. The exhaust system according to claim 2, wherein
the cooler section comprises a plurality of external cooling ribs, which project outwardly from the cooler wall
the external cooling ribs are aligned parallel to a longitudinal center axis of the cooler section and are arranged in a star-shaped manner or parallel to each other;
a cooling airstream generator is provided, which generates a cooling airstream which is applied to the cooler section from an outside;
the external cooling ribs are formed integrally on the cooling wall to form a one-piece heat transfer structure, said cooling ribs transferring heat from said cooler section to a position outside of said cooler section.

15. The exhaust system according to claim 1, wherein the respective internal cooling rib is formed integrally on the pipe wall or on the cooler wall to form one-piece heat transfer structure.

16. An exhaust system comprising:
an exhaust pipe which conducts exhaust gas;
an active silencer comprising a silencer housing and an electro-acoustic converter arranged in said silencer housing;
a connection pipe which connects said silencer housing fluidically to said exhaust pipe, said connection pipe having an outer connection pipe surface;
a cooler section comprising an inner cooler wall and a cooling rib, said cooling rib projecting inwardly into a cross section of said cooler section from said inner cooler wall, wherein said cooling rib is integrally connected to said inner cooler wall to form a one-piece heat transfer structure, said inner cooler wall engaging said outer connection pipe surface, said one-piece heat transfer structure being arranged between said silencer housing and said exhaust pipe.

17. The exhaust system according to claim 16, wherein:
said cooler section comprises a cooler wall which encloses a cross section of said connection pipe in a circumferential direction;
said cooling rib is arranged in said cooler section, said cooling rib being exposed to the exhaust gas, wherein said cooling rib transfers heat from an interior of said cooler section to an outer surface of said cooler section; and
said internal cooling rib projects inwardly from said cooler wall, said connection pipe being located at an acute angle with respect to said exhaust pipe.

18. The exhaust system according to claim 16, wherein said cooler section further comprises another cooling rib to provide a plurality of outer cooling ribs, each of said outer cooling ribs being integrally connected to said cooler section, wherein said cooler section comprises a tubular body which is separate from said connection pipe and is installed in said connection pipe, said tubular body comprising said inner cooler wall.

19. The exhaust system according to claim 16, further comprising a thermal radiation blocking means for blocking thermal radiation emanating from exhaust gas from reaching said silencer housing whereby thermal radiation is prevented from passing from an exhaust gas stream in said exhaust pipe or from said exhaust pipe through said connection pipe to said converter, said thermal radiation blocking means comprising said cooling rib and another cooling rib, said cooling rib and said another cooling rib closing off a cross section of said cooler section such that a line of sight path is blocked in a viewing direction which runs parallel to a longitudinal center axis of said cooler section, said another cooling rib being integrally connected to said inner cooler wall, wherein a portion of said cooling rib overlaps with a portion of said another cooling rib with respect to said longitudinal center axis, said portion of said cooling rib being located at a spaced location from said portion of said another cooling rib with respect to said longitudinal center axis.

20. The exhaust system according to claim 19, wherein said thermal radiation blocking means comprises a curve in said connection pipe such that no straight connection leads unhindered from said exhaust pipe to said silencer housing through said connection pipe to form a sound propagation path that is impermeable to thermal radiation emanating from the exhaust gas, said connection pipe having a bent portion, said bent portion defining at least a portion of said curve, said bent portion being located between said silencer housing and said cooler section.

* * * * *